US010324874B2

(12) United States Patent
Schwach et al.

(10) Patent No.: US 10,324,874 B2
(45) Date of Patent: Jun. 18, 2019

(54) REAL-TIME EMBEDDED SYSTEM (71) Applicant: Andium Inc., New York, NY (US)

(72) Inventors: Jory Schwach, New York, NY (US); Brian Bosak, Brooklyn Park, MN (US)

( * ) Notice: Subject to any disclaimer, the term of this patent is extended or adjusted under 35 U.S.C. 154(b) by 0 days.

(21) Appl. No.: 15/639,866

(22) Filed: Jun. 30, 2017

(65) Prior Publication Data

US 2017/0364462 A1    Dec. 21, 2017

Related U.S. Application Data

(63) Continuation of application No. 14/477,425, filed on Sep. 4, 2014, now Pat. No. 9,697,150.

(60) Provisional application No. 61/873,826, filed on Sep. 4, 2013, provisional application No. 61/873,796, filed on Sep. 4, 2013.

(51) Int. Cl.
*G06F 13/24* (2006.01)

(52) U.S. Cl.
CPC .................... *G06F 13/24* (2013.01)

(58) Field of Classification Search
USPC ........................................................ 710/269
See application file for complete search history.

(56) References Cited

U.S. PATENT DOCUMENTS

| | | | | |
|---|---|---|---|---|
| 4,800,483 A * | 1/1989 | Yamamoto | ......... | G06F 12/0866 710/305 |
| 5,018,098 A * | 5/1991 | Taniai | ..................... | G06F 9/268 710/22 |
| 5,036,458 A * | 7/1991 | Matsushima | ........... | G06F 13/32 710/261 |
| 5,410,709 A * | 4/1995 | Yu | .......................... | G06F 13/24 710/269 |
| 5,469,567 A * | 11/1995 | Okada | ............... | G06F 17/30008 |
| 5,845,329 A * | 12/1998 | Onishi | .................. | G06F 3/0613 711/157 |
| 5,963,546 A * | 10/1999 | Shoji | ...................... | H04L 45/12 370/238 |
| 6,505,305 B1 * | 1/2003 | Olarig | .................... | G11C 29/76 714/5.11 |
| 6,532,491 B1 * | 3/2003 | Lakis | .................. | H04L 41/0213 709/223 |
| 6,698,015 B1 * | 2/2004 | Moberg | .............. | G06F 9/44521 717/141 |
| 7,230,916 B2 * | 6/2007 | Stamatelakis | ............. | H04J 3/14 370/227 |
| 7,984,268 B2 * | 7/2011 | Hass | ...................... | H04L 49/90 712/214 |
| 8,045,546 B1 * | 10/2011 | Bao | ......................... | H04L 45/14 370/386 |
| 8,176,298 B2 * | 5/2012 | Hass | ...................... | H04L 49/90 712/10 |

(Continued)

*Primary Examiner* — Paul R. Myers
(74) *Attorney, Agent, or Firm* — Dykema Gossett PLLC (57) ABSTRACT

A real-time operating system (OS) for an embedded system may be configured for asynchronous handling of input and output (I/O) operations. When application code is executing, the OS may be configured to register I/O interrupts and queue I/O operations. When no application code is executing, the OS may be configured to call appropriate interrupt handlers. As result, the OS may maintain the real-time execution that may be required of applications on an embedded system while providing the flexibility and scalability offered by an operating system.

15 Claims, 4 Drawing Sheets

(56) References Cited

U.S. PATENT DOCUMENTS

| | | | |
|---|---|---|---|
| 9,063,821 B1* | 6/2015 | Emelyanov | G06F 9/45558 |
| 9,235,426 B2* | 1/2016 | Yamashita | G06F 9/441 |
| 9,697,150 B2* | 7/2017 | Schwach | G06F 13/24 |
| 2002/0161957 A1* | 10/2002 | Comeau | G06F 9/4812 710/260 |
| 2003/0018842 A1* | 1/2003 | Harbin | G06F 13/24 710/260 |
| 2004/0096216 A1* | 5/2004 | Ito | H04B 10/0775 398/33 |
| 2005/0223080 A1* | 10/2005 | Gray | H04L 67/36 709/213 |
| 2006/0095479 A1* | 5/2006 | Goldberg | G06F 11/1417 |
| 2006/0265472 A1* | 11/2006 | Seitz | H04L 67/02 709/217 |
| 2008/0010426 A1* | 1/2008 | Yamamoto | G06F 9/3012 711/163 |
| 2008/0123682 A1* | 5/2008 | Yackoski | H04L 45/34 370/443 |
| 2010/0111088 A1* | 5/2010 | Olofsson | G06F 15/17381 370/392 |
| 2010/0186018 A1* | 7/2010 | Bell, Jr. | G06F 9/4856 718/104 |
| 2010/0293314 A1* | 11/2010 | Kataoka | G06F 13/24 710/262 |
| 2011/0088037 A1* | 4/2011 | Glistvain | G06F 9/4843 718/103 |
| 2012/0099587 A1* | 4/2012 | Fan | H04W 40/16 370/389 |
| 2013/0166439 A1* | 6/2013 | Chanda | G06F 17/21 705/39 |

* cited by examiner

REAL-TIME EMBEDDED SYSTEM

CROSS-REFERENCE TO RELATED APPLICATIONS

This application claims the benefit of U.S. provisional application No. 61/873,826, filed 4 Sep. 2013, and U.S. provisional application No. 61/873,796, filed 4 Sep. 2013, both of which applications are hereby incorporated by reference.

BACKGROUND a. Technical Field

The instant disclosure relates to embedded systems, including operating systems and dynamic libraries for real-time embedded systems.

b. Background Art

Embedded systems are generally designed and implemented to fulfill a specific purpose. Accordingly, the hardware, software, and logic components of embedded systems may be generally simple and may be configured to perform a single intended function (or set of functions) with a minimum amount of processing power and memory to occupy a minimum amount of space and minimize the cost of the embedded system. Known embedded systems, to the extent they include software at all, thus generally implement static programming. Known embedded systems generally lack an operating system.

Embedded systems may be required to process data substantially in real-time. For example, global positioning system (GPS) systems may be included in a wide-ranging number of systems, including cell phones, navigation systems, and the like. Because the data from GPS systems may be used in conjunction with a rapidly-moving vehicle, for example, location data may need to be output by the GPS system in real-time to be useful. Numerous other embedded systems must operate substantially in real-time for usefulness (e.g., GPS), safety (e.g., aircraft systems), and other reasons.

SUMMARY

As increased processing power and memory have become available for a lower cost and in a smaller amount of space, greatly increased processing power and memory in embedded systems has become feasible. Yet still, embedded systems generally do not include operating systems. As a result, known embedded systems are limited in application and do not provide sufficient capability to easily service and update software. An operating system that is capable of maintaining real-time processing of data for an embedded system may cure the deficiencies of known embedded systems. Furthermore, embedded systems generally do not include dynamic library linking or loading. An embedded system that is configured for dynamic, network-based library linking and/or loading may cure deficiencies of known embedded systems.

An embodiment of a real-time operating system (OS) for an embedded system may be configured for asynchronous handling of input and output (I/O) operations. When application code is executing, the OS may be configured to register I/O interrupts and queue I/O operations. When no application code is executing, the OS may be configured to call appropriate interrupt handlers. As a result, the OS may maintain the real-time execution that may be required of applications on an embedded system while providing the flexibility and scalability offered by an operating system.

In a further embodiment, an OS for an embedded system may be configured for dynamic library linking and/or loading. That is, the embedded system, through the OS, may be configured to provide a single set of libraries for the applications, and the embedded system, through the OS, may be configured to acquire some or all of the set of libraries over a network connection. In an embodiment, the embedded system though the OS, may be configured to acquire libraries at runtime of the application that needs the libraries. By dynamically linking and loading libraries, the embedded system may provide increased functionality over what would otherwise be possible for the memory resources of the embedded system.

An exemplary method of operating an embedded system having one or more applications installed thereon in real-time may comprise a number of steps. The method may first include registering a respective interrupt handler for each of the one or more applications. The method may further include receiving a processing request from one of the one or more applications and servicing the processing request. The method may further include receiving an input or output (I/O) request from one of the one or more applications while servicing the processing request, waiting for servicing the processing request to complete, and, after servicing the processing request is complete, servicing the I/O request with the interrupt handler associated with the application from which the I/O request was received.

An embodiment of a real-time embedded system may include a processor and a memory storing instructions configured to be executed by the processor. The instructions may comprise an operating system configured to register a respective interrupt handler for each of one or more applications stored in the memory, receive a processing request from one of the one or more applications, and service the processing request. The operating system may be further configured to receive an input or output (I/O) request from one of the one or more applications, wait for servicing the processing request to complete, and, after servicing the processing request is complete, service the I/O request with the interrupt handler associated with the application from which the I/O request was received.

DETAILED DESCRIPTION

Exemplary Mesh Network.

Figure 1:
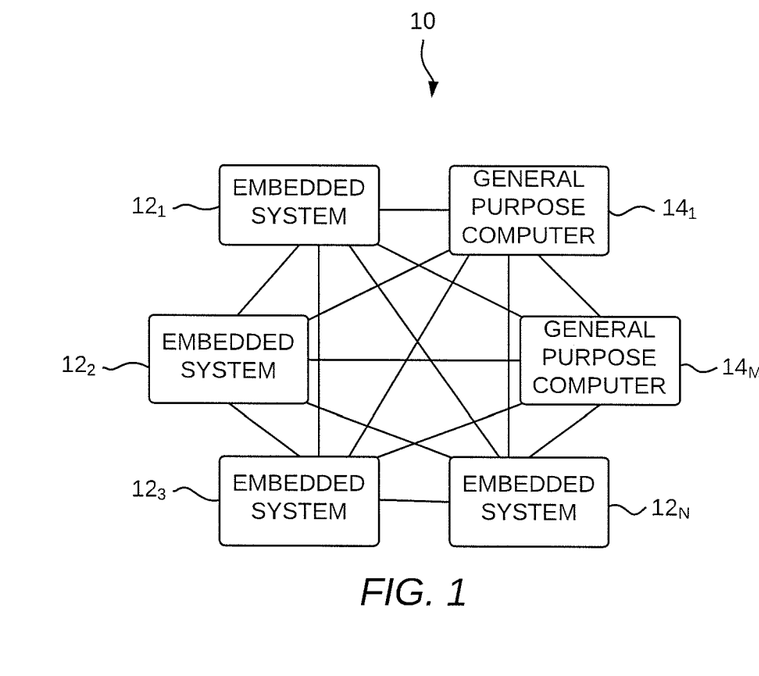
FIG. 1 is a diagrammatic view of an exemplary embodiment of a mesh network.

Referring to the drawings, wherein like reference numerals refer to the same or similar components in the various views, FIG. 1 is a block diagram view of an exemplary mesh network 10. The mesh network 10 may include one or more embedded systems $12_1$, $12_2$, $12_3$, . . . , $12_N$ (which may be referred to collectively as the embedded systems 12 or individually as an embedded system 12) and one or more general purpose computers $14_1$, . . . , $14_M$ (which may be referred to collectively as the general purpose computers 14 or individually as a general purpose computer 14), which may be collectively referred to as the mesh network devices 12, 14. Each of the embedded systems 12 may include its own processing and memory resources, as discussed in greater detail below in conjunction with FIG. 2. Each of the general purpose computers 14 may also include its own processing and memory resources. In an embodiment, one or more of the general purpose computers 14 may include and/or may be replaced in the mesh network by a dedicated server, such as a library server, as described below.

As used herein, "embedded systems" refer to computing systems that are integrated (i.e., embedded) into larger systems and/or devices, which larger systems or devices include particular electrical, mechanical, and other components, with processing and memory resources and I/O components and peripherals specifically selected and configured to perform operations related to the particular electrical, mechanical, and other components of the larger system or device. Embedded systems 12 are different from general purpose computers 14, which include processing and memory resources and I/O components and peripherals designed to accommodate a wide range of purposes or applications.

The embedded systems 12 and general purpose computers 14 may be configured to communicate with each other via one or more common communications protocols. For example, the embedded systems 12 and general purpose computers 14 may be configured to communicate over one or more of a Bluetooth protocol (e.g., substantially as described in the "Specification of the Bluetooth System: Covered Core Package version 4.0," published 30 Jun. 2010, which is hereby incorporated by reference in its entirety as though fully set forth herein), such as a Bluetooth Low Energy (BLE) protocol, IEEE 802.11 (WLAN), IEEE 802.15 (WPAN), IEEE 802.16 (WiMAX), Global Grid Protocol (substantially as described and shown in co-pending U.S. patent application Ser. No. 13/506,051, which is hereby incorporated by reference in its entirety as though fully set forth herein), and/or another wireless networking protocol. The embedded systems 12 and general purpose computers 14 in the mesh network 10 may also be configured to communicate over known types of wired connections. The embedded systems may improve upon and deviate from the requirements and teachings of known specifications. For example, the BLE protocol requires a central node and peripheral nodes, limiting the scalability of a BLE network. In contrast, the system 10 does not require a central node.

Two or more of the mesh network devices 12, 14 may maintain persistent, continuous peer-to-peer connections with each other, in an embodiment. Conversely, two or more of the mesh network devices 12, 14 may open and close connections with each other intermittently and as necessary or desired, in an embodiment.

The mesh network devices 12, 14 may all form part of the same broader system, in an embodiment. The embedded systems 12 may all perform different functions from each other, or two or more of the embedded systems 12 may perform duplicate or redundant functions, in embodiments. For example only, the mesh network devices 12, 14 may form a part of an automated or partially-automated assembly line. In such an example, a first embedded system $12_1$ may include a sensor for detecting a temperature or other performance variable of a first component, a second embedded system $12_2$ may include and operate a display for viewing by workers on the assembly line, a third embedded system $12_3$ may control an actuator for a second component on the assembly line, and a general purpose computer $14_1$ may include programs for monitoring and directing numerous actuators and sensors on the assembly line, for example only.

Generally, as noted above, embedded systems 12 are designed for particular purposes, with programming instructions for performing one or more particular functions and processing and memory resources specifically configured for those particular functions. As a result, embedded systems 12 may be less expensive to produce and implement than general purpose computers 14, but also may be more difficult to re-purpose. For example, in the assembly line example given above, a traditional embedded system that includes and operates a display may not provide the ability to alter the format of the display or information included on the display, for example.

In contrast, the embedded systems 12 of the mesh network 10 may include operating systems, thus providing the ability to install, remove, and modify applications installed on the embedded systems 12. For example, returning to the assembly line example, the embedded system $12_2$ that includes and operates a display may provide the ability to update or alter the contents or format of the display via an operating system, such as when components are added or removed from the assembly line. Furthermore, if the embedded system 12 includes sufficient memory resources, the embedded system 12 may provide the ability to install additional applications.

Exemplary Embedded System

Figure 2:
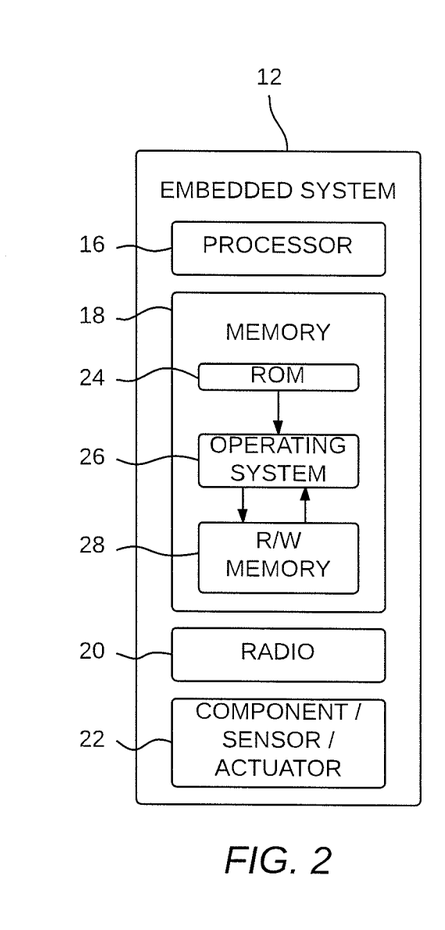
FIG. 2 is a block diagram view of an exemplary embedded system.

FIG. 2 is a block diagram view of an exemplary embodiment of an embedded system 12. The embedded system 12 may include a processor 16, a memory 18, a transmit/receive radio 20, and a component/sensor/actuator 22. The memory 18 may include instructions configured to be executed by the processor 16. The instructions may include an operating system (OS) 26, in an embodiment, substantially as described herein and with additional functions and features known in the art. The memory may further comprise a read-only-memory (ROM) 24 and a read/write (R/W) memory 28.

The component/sensor/actuator 22 may be or may include one or more components, sensors, and/or actuators that provide the underlying purpose of the embedded system 12. That is, the processor 16, memory 18, and software applications installed in the memory 18 for operation by the OS 26 may be specifically selected and configured for operation with the component/sensor/actuator.

Two or more of the processor 16, memory 18, radio 20, and component/sensor/actuator 22 may be incorporated into a single microcontroller, in an embodiment. Thus, the entire embedded system 12 may be implemented on a single integrated circuit (i.e., a system-on-a-chip), in an embodiment.

The memory 18 may, as noted above, include separate ROM 24 and R/W 28 portions. Alternatively, the memory 18 may include only a R/W portion 28. The ROM portion 24 may include any type of "read-only" memory including, but not limited to, mask ROM, programmable ROM (PROM), erasable programmable ROM (EPROM), and electrically-erasable programmable ROM (EEPROM). The R/W portion 28 may include, for example, any volatile or non-volatile memory type including, but not limited to, RAM, flash memory, and other NVRAM.

The OS 26 may be stored and/or executing in either or both of the R/W 28 and ROM 24 portions of memory 18, in an embodiment, and/or to some other portion of the memory 18. The OS 26 may be configured to write data to the R/W memory 28, to read data from the R/W memory 28, and to read data from the ROM 24. In an embodiment in which the ROM 24 includes PROM, EPROM, EEPROM or other slowly-writeable memory, the OS may be further configured to write data to the ROM 24.

The OS 26 may be configured to operate the embedded system 12 in real-time, in an embodiment. That is, the OS 26 may be configured to operate one or more applications installed on the embedded system 12 with negligible lag between data input to the embedded system 12 and data output from the embedded system 12. For example, in an embodiment in which the component/sensor/actuator 22 includes a GPS antenna, and the embedded system 12 includes an application for determining and outputting a location of the embedded system 12 based on signals from GPS satellites, the operating system 26 may be configured to operate the application with negligible lag between receipt of GPS signals through the GPS antenna and output of a location.

The OS 26 may be configured, in an embodiment, to manage the hardware resources of the embedded system 12 (e.g., the processor 16 and the memory 18) for one or more applications installed in the memory 18. The applications may be designed and/or implemented for one or more specific purposes, in an embodiment, such as the tasks or operations of a particular embedded system 12. The OS 26 may also be configured for additional operations, as described herein.

Input/Output Operations.

In an embodiment, all I/O operations may be performed through the OS 26, rather than by applications independently. As a result, the applications need not compete for resources, and no mutex or cross-thread code may be required, saving memory resources. Thus, in an embodiment, the OS 26 may lack mutex or cross-thread programming.

The OS 26 may be configured to transmit and receive data with the radio 20 in one or more communications protocols to enable a mesh network according to one or more such protocols, as noted above in conjunction with FIG. 1. In an embodiment, the OS 26 may enable up to $2^{128}$ devices to be addressed (and therefore connected) in a mesh network, exceeding the number of devices permitted on most known mesh networks.

As noted above, the OS 26 may be configured to provide communications capabilities with other devices by operating the radio 20 of the embedded system 12. To provide such communications capabilities (i.e., network I/O), the OS 26 may be configured to control (e.g., open and close) one or more different types of communications "sockets." In an exemplary embodiment, the OS 26 may provide three different socket types that may be used for different types of transmissions. First, a "Reliable Socket" may be opened for persistent broadcasting and receiving of data with a particular device or system, for example. A Reliable Socket may be created by the OS 26 in response to either a connection request from a peer device in the mesh network or a connection response from a Listening Socket (described below). In a Reliable Socket transmission, if data is not received by the intended endpoint, an error may be registered by the OS 26. A Reliable Socket may be used for transmission or receipt of large amounts of data, in an embodiment. The radio 20 may remain on for the duration of a Reliable Socket, in an embodiment.

A "Listening Socket" may be opened to listen for external devices, for example. Once an external device signal is discovered, in an embodiment, a Reliable Socket may be opened by the OS 26 for a persistent connection with that external device.

Finally, an "Unreliable Socket" may be opened for broadcasting undirected data. When an Unreliable Socket is open, the radio 20 may be turned on only when data is transmitted, in an embodiment. Thus, an Unreliable Socket may be preferred over a Reliable Socket, in an embodiment, when a particular destination for transmitted data is not required and/or reliable receipt of data is not required.

It should be noted that the communications details described herein (e.g., protocols, "socket" types, etc.) are exemplary in nature only and are not limiting except as expressly set forth in the claims. Thus, any number of different communications protocols, communications "sockets," and other communications details may be added or altered without departing from the scope and spirit of the present disclosure.

Memory Portions and Addressing.

Figure 3:
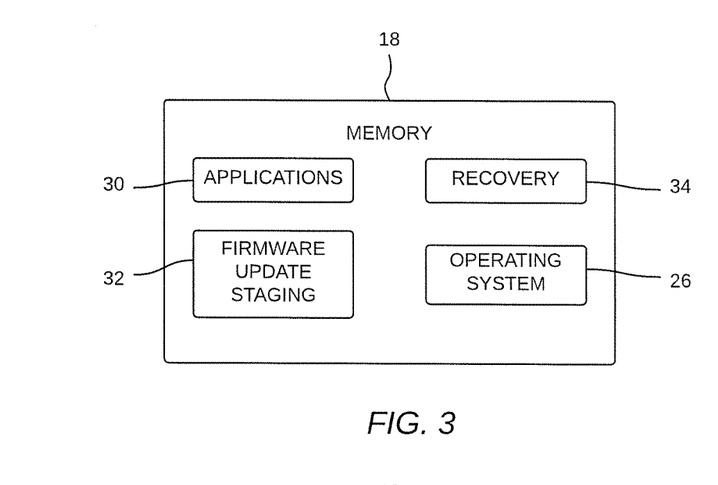
FIG. 3 is a block diagram illustrating exemplary portions of a memory of the embedded system of FIG. 2.

The operating system 26 may be configured to apportion memory 18, write to memory 18, read from memory 18, and delegate those and other tasks to applications as needed. FIG. 3 is a block diagram illustrating portions of the memory 18 that may be apportioned and maintained by the operating system 26, in an embodiment. First, the OS 26 may maintain a portion of memory for one or more applications 30. That is, the OS 26 may manage ROM 24 and R/W 28 memory resources for the storage and operation of applications 30.

In an embodiment, the applications 30 may be configured to share a single set of libraries, rather than each of the applications 30 having its own set of libraries (i.e., dynamically-linked libraries). Thus, in an embodiment, the OS 26 may be configured to control access to the libraries by the applications 30 and to supplement the libraries as needed through dynamic library loading, as described below. The libraries may be stored in the applications 30 portion of memory 18, in an embodiment.

Unlike many known embedded systems, the OS 26 may provide the capability for updating the firmware of the embedded system. In an embodiment, the OS 26 may maintain a staging area 32 in the memory 18 for firmware updates, where updates may be stored before being copied into executable memory. Additionally, in an embodiment, the OS 26 may maintain a system recovery portion 34 in the memory 18, where a configuration of the OS 26 and installed applications 30 may be maintained in case of a crash during a software install or update. The OS 26 may be configured to periodically (e.g., automatically and/or responsive to user command) update the system recovery portion 34 of the memory 18 to match the current configuration.

In an embodiment, the OS 26 may be configured to address one or more portions of the memory 18 using 128-bit addressing, compressed to 64-bit. Four-byte connection handles may be used, in an embodiment. Of course, the OS 26 is not limited to such address and connection handle lengths. In different embodiments, different lengths may be used as appropriate.

Applications Registration.

Figure 4:
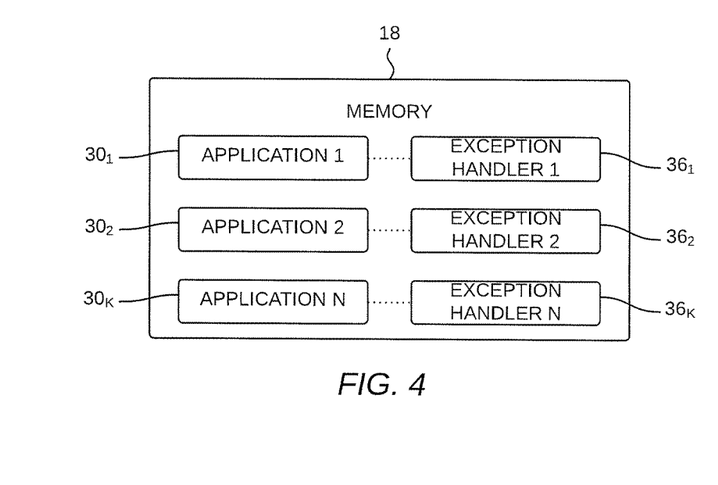
FIG. 4 is a block diagram illustrating respective exemplary associations of a plurality of applications installed on the embedded system of FIG. 2 with a plurality of exception handlers.

In order to properly handle the I/O calls of one or more applications 30, the OS 26 may be configured to register each application 30 installed on the embedded system 12 and to register an interrupt handler for each application 30. FIG. 4 is a block diagram illustrating associated applications and interrupt handlers registered with the OS. In an embodiment, the OS may register a plurality of applications $30_1$, $30_2$, ..., $30_K$, each of which may register a respective associated interrupt handler $36_1$, $36_2$, ..., $36_K$ with the OS 26. The OS may register applications 30 and interrupt handlers 36 on startup of the embedded system 12, in an embodiment. Application 30 and interrupt handler 36 registration may additionally or alternatively occur when the OS 26 or firmware is updated, or when the embedded system recovers from a crash. Following registration, the OS 26 may maintain a registry of applications and interrupt handlers, which registry may be referred to for servicing I/O requests from the applications, as described below in conjunction with FIG. 5.

Asynchronous Real-Time Operation.

The OS 26 may be configured for asynchronous handling of input and output (I/O) operations. When application code is executing, the OS 26 may be configured to register I/O interrupts and queue I/O operations. When no application code is executing, the OS may be configured to call appropriate interrupt handlers 36. In an embodiment, the OS 26 and applications 30 implemented through the OS 26 may lack synchronous interrupt calls. Accordingly, for some or all I/O operations, the OS 26 may be configured to advance to the next processing task before a commanded I/O operation has been completed.

Figure 5:
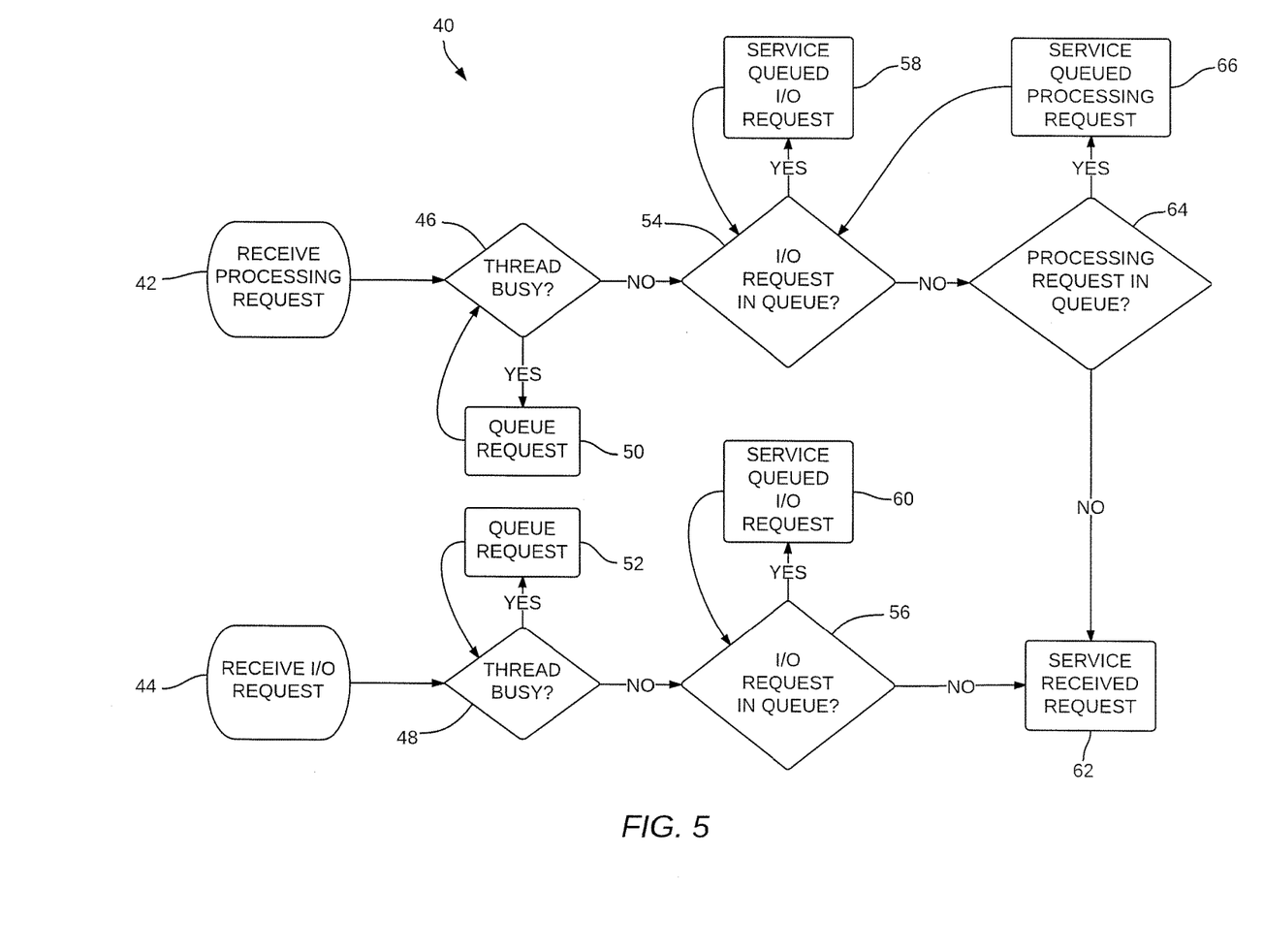
FIG. 5 is a flow chart illustrating an exemplary method of operating the embedded system of FIG. 2.

FIG. 5 is a flow chart illustrating a method 40 of operating an embedded system having one or more applications installed thereon, such as the embedded system 12 shown in FIG. 2, in real time. The method 40 may be performed by the operating system 26 in the embedded system 12 of FIG. 2. The method 40 generally implements asynchronous I/O handling by queuing I/O operations until application code is complete, rather than interrupting the implementation of application code to service I/O requests, and continuing to service processing requests while I/O operations are serviced by appropriate interrupt handlers. The method 40 is illustrated and described with reference to an embodiment having a single processing thread executing on a single processing core. In another embodiment, in which multiple processing cores are included in the embedded system, each of which may each execute its own processing thread, the method 40 may include different or additional steps.

The method 40 may begin with receiving a processing request 42 or receiving an I/O request 44. For either request type, the method may advance to determining if the processing thread is busy 46, 48—i.e., determining if the processing thread is executing application code from an application installed on the embedded system to service a processing request from that application. If the thread is busy, the method 40 may advance to queuing the request until the thread is not busy 50, 52.

If the thread is not busy, or once the thread is not busy, the method 40 may advance to determining if there is an I/O request in the queue 54, 56. If there is an I/O request in the queue, then the method 40 may advance to servicing a queued I/O request 58, 60. An I/O request received from a particular application may be serviced with an interrupt handler that was registered with that application during the OS boot sequence or at another time, in an embodiment. As described above with reference to FIG. 4, associations between applications and interrupt handlers may be stored in a registry. Once servicing the I/O request is complete (i.e., once the thread is no longer busy), the method 40 may return to determining if there is an I/O request in the queue 54, 56. In an embodiment, the method 40 may return to determining if there is an I/O request in the queue 54, 56 before servicing the previous I/O request is complete, for asynchronous operation.

If there is not an I/O request in the queue, and the request is an I/O request, the method 40 may advance to servicing the request 62. If there is not an I/O request in the queue, and the request is a processing request, the method 40 may advance to determining if there is a processing request in the queue 64. If there is a processing request in the queue, the method 40 may advance to servicing the queued processing request 66. If there is not a processing request in the queue, the method 40 may advance to servicing the received request 62. Once the received request is serviced—either immediately or from the queue—the embedded system may enter a sleep mode, in an embodiment, waiting for further I/O or processing requests.

Because the OS 26 may delay servicing of I/O calls until application code is not running, applications running on the OS 26 may be coded such that individual functions (i.e., processing required for individual processing requests) are limited in duration. For example only, in an embodiment, application functions may be coded such that each processing request may be completed in two milliseconds or less. Such timing preferences may be feasible given the predictable processing and memory resources of the embedded system. That is, because the available processing and memory resources of the embedded system executing an application may be known to the programmer in advance, the applications may be written so that processing requests may be completed within a desired or required amount of time.

The steps of the method 40 are exemplary in nature only and are not limiting. Instead, there are numerous methods by which an operating system may perform asynchronous I/O with queued processing requests. For example, although the method is illustrated and described herein as giving preference to servicing I/O operations over servicing processing operations, such preference is not required except as explicitly set forth in the claims. Many other changes may be made to the arrangement and content of the steps of the method 40 without departing from the scope and spirit of the present disclosure.

The OS 26 may be configured for use with a processor 16 having a single core, two cores, three cores, etc. In a multi-core embodiment, a single core may be configured to queue and service I/O interrupts, and additional cores may be dedicated to data processing operations delegated by the first core. Thus, in an embodiment, the first core may receive all I/O and processing requests from applications, perform certain processing tasks, and delegate processing requests to the second and other cores as needed. The second and other cores, in turn, may be able to communication only with the first core, and may not be able to communicate with the applications or I/O devices themselves.

Transmission-Based Distance Determination.

In addition to the more general capabilities and functions that may be provided by the OS 26 described above, the OS may provide numerous other services that may be useful in a mesh network or otherwise. As part of the data transmission capabilities of the system, the OS 26 may be configured to determine and/or approximate the distance between an embedded system 12 on which the OS 26 is installed and another device with which the embedded system 12 is communicating wirelessly. A distance estimate may be made according to the frame size (in time) and the number of packets retransmitted—because the number of packet retransmissions that are needed correlates to the distance between two devices, the OS 26 may associate a given number of retransmitted packets for a given frame size with a particular distance. Additionally or alternatively, this association may be performed by an application running on the OS 26, with access to transmission information (e.g., frame size, number of packet retransmissions) provided to the application or enabled by the OS 26. Accordingly, an embedded system 12 may be configured to determine a distance between itself and a device with which it is in wireless communication by counting the number of packets that need to be retransmitted to completely transmit a given message and associating that number with a distance. The number of packets that must be retransmitted may be associated with a distance according to a look-up table or formula, in an embodiment.

Virtualization.

The OS 26 may additionally enable virtualization, in an embodiment. The virtualization may be performed at the kernel level (i.e., "ring zero" of a hierarchical security scheme), as in some known virtualization methods, or it may be performed in software, by the OS 26, at an outer ring of the security scheme. Thus, the OS 26 may be configured to provide virtualization of a second user space, apart from the space provided by the OS 26 itself, that may appear to a user to be independent of the OS 26. However, because the OS 26 may maintain exclusive access to the kernel, implementation of software-based virtualization may be more secure, as the second user space need not be given separate access to the kernel, as in many known virtualization methods.

Figure 6:
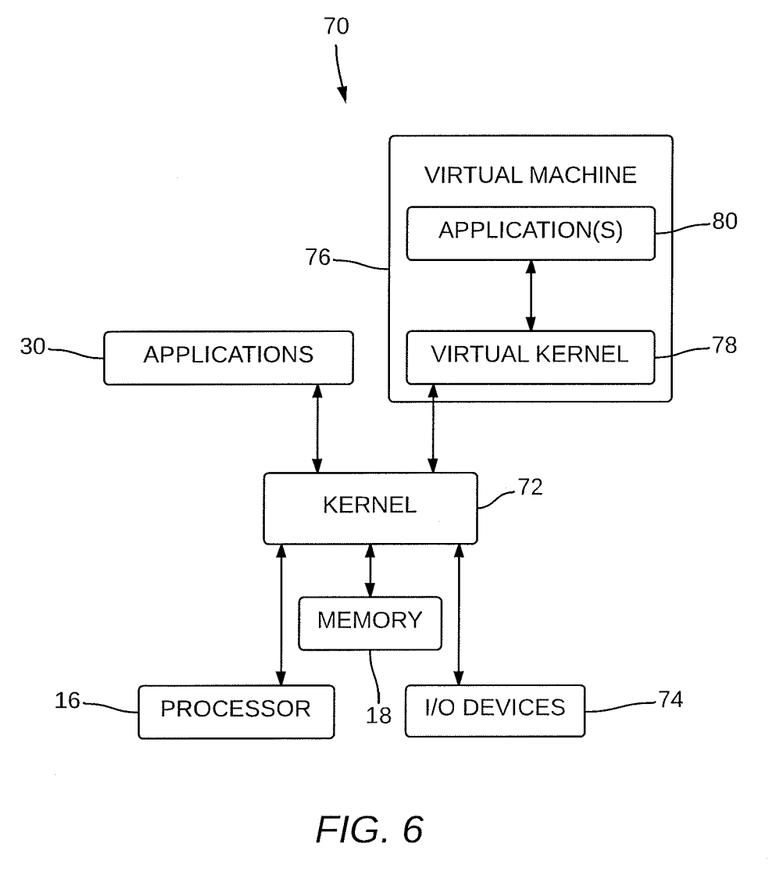
FIG. 6 is a block diagram view of an exemplary embodiment of a virtualization system that may be implemented in the embedded system of FIG. 2.

FIG. 6 is a block diagram view of a virtualization system 70. The virtualization system 70 illustrated in FIG. 6 may be implemented through one or more embedded systems 12 of FIGS. 1 and 2, for example, though it is not limited to implementation on embedded systems. Referring to FIGS. 2 and 6, the virtualization system 70 may include a kernel 72, the processor 16, the memory 18, one or more I/O devices 74 (which may include the radio 20 and component/sensor/actuator 22), one or more applications 30, and a virtual machine 76. The virtual machine may respectively include a virtual kernel 78 and one or more applications 80.

The kernel 72 may manage the resources of the system—i.e., the processor 16, memory 18, and I/O devices 74—for use by the applications 30. For example, the kernel 72 may manage I/O requests from the applications 30 and generate data processing instructions for the processor 16, memory 18, and I/O devices 74. The kernel 72 may be a part of the operating system 26 (see FIG. 3), and thus may perform I/O tasks substantially as described herein.

Referring to FIGS. 3 and 6, the virtual machine 76 may be created and provided by the operating system 26. The virtual machine may be created under a virtualization engine such as, for example only, V8, the JavaScript virtual machine engine commercially available from Google, Inc., or the .NET framework commercially available from Microsoft, Inc. A virtual machine 76 may be created to virtualize the entire OS 26 (or a substantial portion thereof), in an embodiment. Alternatively, a virtual machine 76 may be created for each application 80 to be run in a virtualized environment.

The virtual machine 76 may execute one or more applications 80, which may be the same applications 30 as those stored in the embedded system memory 18, in an embodiment. To execute the virtual machine application(s) 80, the virtual machine 76 may be provided with a software-based virtual kernel 78 that services I/O calls from the application(s) 80 running on the virtual machine 76. The virtual kernel 78 may, among other features, distinguish the system 70 from known virtualization systems.

The virtual kernel 78 may be provided with a privilege level customized to the needs of the virtual machine 76. For example, the virtual kernel 78 may have heightened privileges relative to the applications 30, but lower privileges relative to the kernel 72. The privileges granted to a virtual kernel 78 may be determined at the time of implementation of the virtual machine 76, in an embodiment. For example, in an embodiment, the virtual kernel 78 may be configured to access hardware resources (e.g., the processor 16, memory 18, and I/O devices 74) through the kernel 72, rather than having direct access to the hardware resources. Alternatively, the virtual kernel 78 may be configured for direct access to one or more hardware resources, but for accessing some other resources through the kernel 72.

In an embodiment, the virtual machine 76 may be implemented on a first embedded system or other system and hosted by a second embedded system or other system. Thus, the second system may be provided access to the hardware resources and, if desired, applications 30 of the first system. Such an arrangement may provide several advantages. First, a number of embedded systems or other systems may execute common applications through virtual machines accessed by those systems without requiring the applications to be installed on those systems. Second, applications can be run by a system which the system would ordinarily not have resources to install and/or execute. Third, through the use of the virtual kernel, virtual machines may be implemented on one or more machines without the security risk inherent in directly exposing the hardware resources of the host machine to the virtual machine. Fourth, separate privilege levels may be created for different applications executing on a virtual machine. For example, if a separate virtual machine (and, thus, separate virtual kernel) is created for each application to be run in a virtualized environment, each virtualized kernel may be given privileges customized to the needs of its application.

Dynamic Library Linking and Loading.

Referring to FIG. 3, an embedded system 12 may be configured for dynamic library linking. As noted above, known embedded systems generally lack operating systems. Accordingly, known operating systems lack the capability for dynamic library linking. In contrast, an embedded system 12 according to the present disclosure may enable dynamic library linking by providing an OS 26. Accordingly, numerous applications installed on the embedded system 12 may share a single set of libraries, conserving the memory resources of the embedded system 12. As noted above, the OS 26 may control access to the libraries by the applications 30.

In addition to dynamic library linking, an embedded system 12 may be configured for dynamic library loading, also enabled by the OS 26. Dynamic library loading may involve the embedded system 12 acquiring libraries (or portions thereof) over a network connection, on demand, as needed by applications 30 stored in memory 18. Thus, the memory resources of the embedded system 12 may be further conserved, and the library size available to the applications increased, by storing libraries remotely and loading them on to the embedded system 12 as needed.

Referring to FIG. 1, an embedded system 12 may be configured to retrieve libraries, and/or portions thereof, on demand from one or more general purpose computers 14

(which may, as noted above, include or be replaced with a dedicated server). Accordingly, in an embodiment, the mesh network 10 may include a dedicated library server. The dedicated library server, or a general purpose computer 14 in the network 10, may be configured to store a plurality of libraries with wide applicability. Libraries may be loaded as necessary by an embedded system 12 over the network connection between the dedicated library server or general purpose computer 14 and the embedded system 12.

In an embodiment, one or more of the embedded systems 12 may be configured to access and download libraries (or portions thereof) over the mesh network 10 at runtime of the application that uses a given library or portion of a library. Accordingly, the memory 18 of an embedded system 12 (see FIG. 2) may include less storage capacity than would be necessary if the embedded system 12 needed to store all libraries for all possible applications that are or may be installed on the embedded system 12. Furthermore, dynamic library loading advantageously allows libraries on an embedded system and/or on a library server or general purpose computer 14 to be updated, supplemented, replaced, etc. with improved libraries or improved library portions.

In an embodiment of the mesh network 10, a set of libraries may be stored in a dedicated library server or general purpose computer 14, remote from the embedded systems 12, for access by all of the (e.g., a plurality of) embedded systems 12 on the network 10. Each of the embedded systems 12 may be configured for dynamic library linking and/or loading. In the same or another embodiment, an embedded system 12 may be configured to dynamically load portions of libraries from peer embedded systems 12. Thus, an embedded system 12 according to the present disclosure may be further configured to share library portions stored in its memory with other embedded systems.

Directed Broadcast Routing.

An embedded system 12 may also be configured for a novel method of data transmission to a specific other embedded system 12, which method may be referred to herein as directed broadcast data routing. Referring to FIG. 1, the method may begin with a step that includes an originating or master device (e.g., the general purpose computer 14$_1$) establishing communication with an initial embedded system (e.g., embedded system 12$_1$), which may the closest-in-distance embedded system 12 in the mesh network 10 to the master device.

The message transmitted in the establishing communication step may be the underlying intended transmission, in an embodiment. That is, the message transmitted in the establishing communication may be or may include the entirety of the message that is intended for the desired embedded system 12. Alternatively, the message transmitted in the establishing communication step may be or may include a portion of the entirety of the message intended for the desired embedded system 12. Alternatively, the message transmitted in the establishing communication step may lack any substantive data intended for the desired embedded system 12, and may instead include a handshake message or the like.

The method may continue to a step that includes the master device determining if the initial embedded system 12$_1$ is the desired embedded system 12 (e.g., is the embedded system 12 with which communication is desired). If the initial embedded system 12$_1$ is the embedded system 12 with which communication is desired, the method may terminate.

If, instead, the initial embedded system 12$_1$ is not the embedded system with which communication is desired by the master device, the method may continue to a step that includes the master device taking control the I/O interface of the initial embedded system 12$_1$. The master device may take control of the I/O interface of the initial embedded system 12$_1$, in an embodiment, by accessing the background debug mode of the initial embedded system 12$_1$.

The method may further include a step that includes the master device controlling the radio of the embedded system 12$_1$ to establish communication with a next embedded system 12 (e.g., embedded system 12$_2$), which may be the next-closest-in-distance embedded system 12 in the mesh network 10. The step of establishing communication with a next embedded system 12 may include the transmission of the substance of the message that was transmitted to establish communication with the initial embedded system 12, in an embodiment. The master device may then communicate with the next embedded system 12$_2$ via the initial embedded system 12$_1$.

The method may then include a step that includes determining if the next embedded system 12$_2$ is the desired embedded system 12. If the embedded system 12$_2$ is the embedded system 12 with which communication is desired, the method may terminate.

If, instead, the next embedded system 12$_2$ is not the embedded system with which communication is desired by the master device, the steps of taking control the I/O interface of the embedded system 12, controlling the radio of the embedded system 12 to establish communication with the next embedded system 12 (e.g., embedded system 12$_3$, then the next embedded system 12, through embedded system 12$_N$), and determining if the next embedded system 12 (i.e., the embedded system 12 with which communication is most recently established) is the desired embedded system 12 may repeat until the desired embedded system 12 is found. At each iteration of the steps (i.e., for each next embedded system 12), communications between the master device and the embedded system 12 with which communication is most recently established may be routed through each previous embedded system 12 with which communication was established, in an embodiment (i.e., such that, in the sequence described above, communications between the master device and embedded system 12$_3$ would go through embedded systems 12$_1$ and 12$_2$).

It should be noted that the description above of the general purpose computer 14$_1$ as the master device is for ease of description only. The described method may find use with any device in any mesh network as the master device, including an embedded system 12. Furthermore, it should be noted that the master device in the method is the device from which a data transmission originates and which desires to transmit the data to a specific other device in the mesh network 10.

Directed broadcast data routing may advantageously remove the need to determine a routing table for the mesh network 10 or to store a routing table in any device in the mesh network 10. Furthermore, each "hop" in the method from one device to the next may add only a small amount of data to the transmitted data (e.g., 3-5 bytes per hop, in an embodiment), so hopping over numerous embedded systems 12 may be possible even with limited memory resources in the embedded systems 12.

Blind Data Transfer.

An embedded system 12 may also be configured for efficient multi-device data transfer. The efficient data transfer method may be used for blind data transfers—that is, data transfers when no particular recipient is intended. Such blind transfers may find use, in an embodiment, when data is to be transferred to the entirety of a given mesh network, for example.

In an embodiment, the data transfer method may include a source device (referring to FIG. 1, an embedded system 12 or general purpose computer 14 may be the source device) transmitting the desired data, or a portion thereof. The transmission may include the underlying data and a maximum hop count. Each embedded system that detects the transmission may accept the data, decrement the hop count, and re-transmit the data. Accordingly, the data may rapidly propagate through a large mesh network without the need to store addressing information.

The data transfer method, like other methods and processes described herein, may be programmed in the OS of the embedded system (i.e., OS 26, see FIG. 2). Accordingly, the OS 26 may be configured to perform the steps and processes of the blind data transfer method of the present disclosure.

In an embodiment, the source device may divide the total data to be transferred (e.g., a single file) into smaller component parts and transmit those component parts separately. Accordingly, different component parts of the data may propagate through the mesh network at different times and along different paths.

Although a number of embodiments have been described above with a certain degree of particularity, those skilled in the art could make numerous alterations to the disclosed embodiments without departing from the sprit or scope of this disclosure. For example, all joinder referenced (e.g., attached, coupled, connected, and the like) are to be construed broadly and may include intermediate members between a connection of elements and relative movement between elements. As such, joined references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Any patent, publication, or other disclosure material, in whole or in part, that is said to be incorporated by referenced herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A method of operating an embedded system, the method comprising:
   establishing communication with an initial embedded system with a computer, wherein:
      the embedded system and the initial embedded system are in a mesh network,
      the initial embedded system is a closest embedded system in the mesh network to the computer, and
      a distance between the computer and the initial embedded system being determined based on a number of packets that need to be retransmitted to transmit a given message from the computer to the initial embedded system;
   determining if the initial embedded system is a desired embedded system; and
   establishing control of an input/output interface of the initial embedded system to establish communication with a next embedded system, in response to the initial embedded system not being the desired embedded system.

2. The method of claim 1, wherein the desired embedded system is an embedded system with which communication is desired.

3. The method of claim 1, further wherein the number of packets that need to be retransmitted to transmit the given message is associated with a distance according to a look-up table.

4. An embedded system comprising:
   a processor;
   a memory storing instructions configured to be executed by the processor, the instructions comprising an operating system configured to:
   establish communication with an initial embedded system that is in the mesh network with a computer, wherein:
      the initial embedded system is a closest embedded system in the mesh network to the computer, and
      a distance between the computer and the initial embedded system is determined based on a number of packets that need to be retransmitted to transmit a given message from the computer to the initial embedded system;
   determine if the initial embedded system is a desired embedded system;

if the initial embedded system is not the desired embedded system, establish control of an output interface of the initial embedded system and control the interface to establish communication with a next embedded system; and determine if the next embedded system is the desired embedded system.

5. The embedded system of claim 4, wherein the operating system is further configured to dynamically link a single set of libraries between two or more applications running on the embedded system.

6. The embedded system of claim 4, wherein the operating system is further configured to download, over a network connection, a library needed by an application running on the embedded system at runtime of the application.

7. The embedded system of claim 4, wherein establishing communication with the desired embedded system that is in the mesh network with the embedded system further comprises:
  (a.) determining if the next embedded system is the desired embedded system;
  (b.) establishing control of an interface of the next embedded system and controlling the interface to establish communication with another next embedded system if the next embedded system is not the desired embedded system; and
  (c.) repeating steps (a.) and (b.) until communication is established with the desired embedded system.

8. The embedded system of claim 4, further comprising an antenna, wherein the operating system is further configured to establish communication with an initial embedded system that is in the mesh network by broadcasting a signal with the antenna.

9. The embedded system of claim 8, wherein the operating system is further configured to broadcast the signal according to a Bluetooth Low Energy protocol.

10. The embedded system of claim 4, wherein the operating system is further configured to maintain a portion of the memory for receiving updates to the operating system.

11. The embedded system of claim 4, wherein the operating system is further configured to maintain one or more recovery files in memory.

12. The embedded system of claim 11, wherein the operating system is further configured to load or execute the one or more recovery files if the operating system cannot properly function.

13. A method of operating an embedded system, the method comprising:
  establishing communication with an initial embedded system with a computer, wherein:
    the embedded system and the initial embedded system are in a mesh network;
    the initial embedded system is a closest embedded system in the mesh network to the computer; and
    a distance between the computer and the initial embedded system is determined based on a number of packets that need to be retransmitted to transmit a given message from the computer to the initial embedded system;
  determining if the initial embedded system is an embedded system with which communication is desired;
  interfacing with a next embedded system via an interface of the initial embedded system in response to the initial embedded system not being the desired embedded system.

14. The method of claim 13, wherein the desired embedded system is an embedded system with which communication is desired.

15. The method of claim 13, further wherein the number of packets that need to be retransmitted to transmit the given message is associated with a distance according to a look-up table.

* * * * *